(12) United States Patent
Ahn

(10) Patent No.: US 7,839,438 B2
(45) Date of Patent: Nov. 23, 2010

(54) CMOS IMAGE SENSOR HAVING SMALL SIZE OPTICAL BLACK AREA

(75) Inventor: Jung-Chak Ahn, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 862 days.

(21) Appl. No.: 11/511,796

(22) Filed: Aug. 29, 2006

(65) Prior Publication Data

US 2007/0046803 A1 Mar. 1, 2007

(30) Foreign Application Priority Data

Aug. 30, 2005 (KR) ............... 10-2005-0079949

(51) Int. Cl.
*H04N 5/217* (2006.01)
(52) U.S. Cl. ............... 348/241; 348/245; 348/243
(58) Field of Classification Search ............... None
See application file for complete search history.

(56) References Cited

U.S. PATENT DOCUMENTS

| | | | |
|---|---|---|---|
| 5,153,421 A | 10/1992 | Tandon et al. | 250/208.1 |
| 6,344,877 B1 * | 2/2002 | Gowda et al. | 348/245 |
| 6,744,526 B2 * | 6/2004 | McDermott et al. | 358/1.11 |
| 6,788,340 B1 * | 9/2004 | Chen et al. | 348/229.1 |
| 6,914,627 B1 * | 7/2005 | Dong | 348/248 |
| 6,972,791 B1 * | 12/2005 | Yomeyama | 348/230.1 |
| 2003/0202111 A1 * | 10/2003 | Park | 348/243 |
| 2004/0051802 A1 * | 3/2004 | Krymski | 348/308 |

OTHER PUBLICATIONS

Japanese Patent Application No. 2002-224972 to Toru et al., having Publication date of May 9, 2003 (w/ English Abstract page).
Japanese Patent Application No. 04-206312 to Toshiyuki, having Publication date of Feb. 25, 1994 (w/ English Abstract page).
Japanese Patent Application No. 09-057425 to Hiromasa, having Publication date of Sep. 25, 1998 (w/ English Abstract page).
Japanese Patent Application No. 2002-049419 to Hiroyuki, having Publication date of Sep. 5, 2003 (w/ English Abstract page).
U.S. Patent Application Publication No. US 2003/0160772 to Kunimu et al., having publication date of Aug. 28, 2003.

* cited by examiner

*Primary Examiner*—David L Ometz
*Assistant Examiner*—Angel L Garces-Rivera
(74) *Attorney, Agent, or Firm*—Monica H. Choi

(57) ABSTRACT

A CMOS image sensor includes a plurality of active pixel rows and an optical black pixel row. The optical black pixel row is activated to generate a respective optical black signal upon activation of each of at least two of the active pixel rows. Such sharing of the optical black pixel row reduces the optical black area of the CMOS image sensor.

20 Claims, 2 Drawing Sheets

CMOS IMAGE SENSOR HAVING SMALL SIZE OPTICAL BLACK AREA

BACKGROUND OF THE INVENTION

This application claims priority to Korean Patent Application No. 2005-79949, filed on Aug. 30, 2005 in the Korean Intellectual Property Office, the disclosure of which is incorporated herein in its entirety by reference.

1. Field of the Invention

The present invention relates generally to complementary metal oxide semiconductor (CMOS) image sensors, and more particularly, to a CMOS image sensor having a reduced number of optical black pixel rows for a smaller size of the optical black area.

2. Background of the Invention

A CMOS image sensor is a photo-electric conversion device that converts an image into electrical signals. The conventional CMOS image sensor includes an active pixel array and an optical black area for converting an image projected onto the active pixel array into digital signals in response to a ramp signal.

When the CMOS image sensor outputs image signals, thermally generated electrons as well as electrons photo-electrically converted from the image are output from the active pixel array. For determining the quantity of just the photo-electrically converted electrons, the quantity of thermally generated electrons is subtracted from the measured total charge quantity.

The optical black area of the CMOS image sensor generates signals for indicating the quantity of the thermally generated electrons. The optical black area is covered with a metal layer to block out light from such an area. Thus, an optical black signal output from the optical black area indicates the quantity of only thermally generated electrons, and the optical black signal is also referred to as a dark signal.

An image signal output from the active pixel array indicates the quantity of both the photo-electrically converted electrons and the thermally generated electrons. Thus, the optical black signal is subtracted from such an image signal to generate a corrected image signal that reflects just the quantity of the photo-electrically converted electrons from the image.

In addition, the image signal from the active pixel array and the optical black signal from the optical black area are converted into digital signals using a ramp signal in a CDS (correlated double sampling) method. However, such a ramp signal also includes a noise component that commonly affects the digital image signal and the digital optical black signal. The noise component of the ramp signal may be removed when the digital optical black signal is subtracted from the digital image signal.

The conventional CMOS image sensor has an equal number of optical black pixel rows as the number of active pixel rows. Thus, a row of active pixels with a corresponding row of optical black pixels is sequentially activated with row select signals for generating corresponding image signals and optical black signals.

A separate respective optical black pixel row formed for each of the active pixel rows in the conventional CMOS image sensor results in a relatively large optical black area. Such a large optical black area disadvantageously reduces availability of area for the active pixel rows. Thus, a CMOS image sensor with reduced size of the optical black area is desired.

SUMMARY OF THE INVENTION

Accordingly, an optical black pixel row is shared among at least two active pixel rows for generating electrical signals from an image for a smaller optical black area in a CMOS image sensor of the present invention.

A CMOS image sensor according to an embodiment of the present invention includes a plurality of active pixel rows and an optical black pixel row. The optical black pixel row is activated to generate a respective optical black signal upon activation of each of at least two of the active pixel rows.

In another embodiment of the present invention, the CMOS image sensor further includes an image signal processor that subtracts the respective optical black signal from a respective image signal to generate a respective corrected signal for each of the at least two active pixel rows.

For example, the image signal processor includes an analog-to-digital converter that generates a respective digital image signal from a ramp signal and the respective image signal, and that generates a respective digital optical black signal from the ramp signal and the respective optical black signal. Additionally, an offset removing unit generates a respective digital corrected signal by subtracting the respective digital optical black signal from the respective digital image signal for each of the at least two active pixel rows.

In a further embodiment of the present invention, the optical black pixel row is the only one activated to generate a respective optical black signal for each of all of the active pixel rows.

In another embodiment of the present invention, the CMOS image sensor also includes a row decoder for generating row select control signals for sequentially activating each of the at least two active pixel rows. In that case, the row select control signals activate the optical black pixel row when any of the at least two active pixel rows are activated.

In another embodiment of the present invention, the optical black pixel row outputs the respective optical black signal simultaneously with any of the at least two active pixel rows outputting the respective image signal.

In a further embodiment of the present invention, the optical black pixel row includes at least one optical black pixel formed in an optical black area having a metal layer formed thereon.

In another aspect of the present invention, a CMOS image sensor includes a plurality of active pixel rows, and a plurality of optical black pixel rows. At least one of the optical black pixel rows is activated to generate a respective optical black signal upon activation of each of at least two of the active pixel rows. A number of the active pixel rows is greater than a number of the optical black pixel rows.

In this manner, an optical black pixel row is shared by at least two active pixel rows for generating electrical signals corresponding to an image. Thus, the CMOS image sensor may have a smaller optical black area from the reduced number of optical black pixel rows.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, and 4 refer to elements having similar structure and/or function.

DETAILED DESCRIPTION OF THE INVENTION

Optical black pixel rows are covered with a metal layer for blocking out light. Thus, optical black signals output from such optical black pixel rows indicating the quantity of thermally generated charge carriers are substantially same. In addition, such dark signals include a same noise component of a ramp signal used in CDS (correlated double sampling) irrespective of the optical black pixel row. Thus, an optical black pixel row is shared among a plurality of active pixel rows in an aspect of the present invention.

Figure 1:
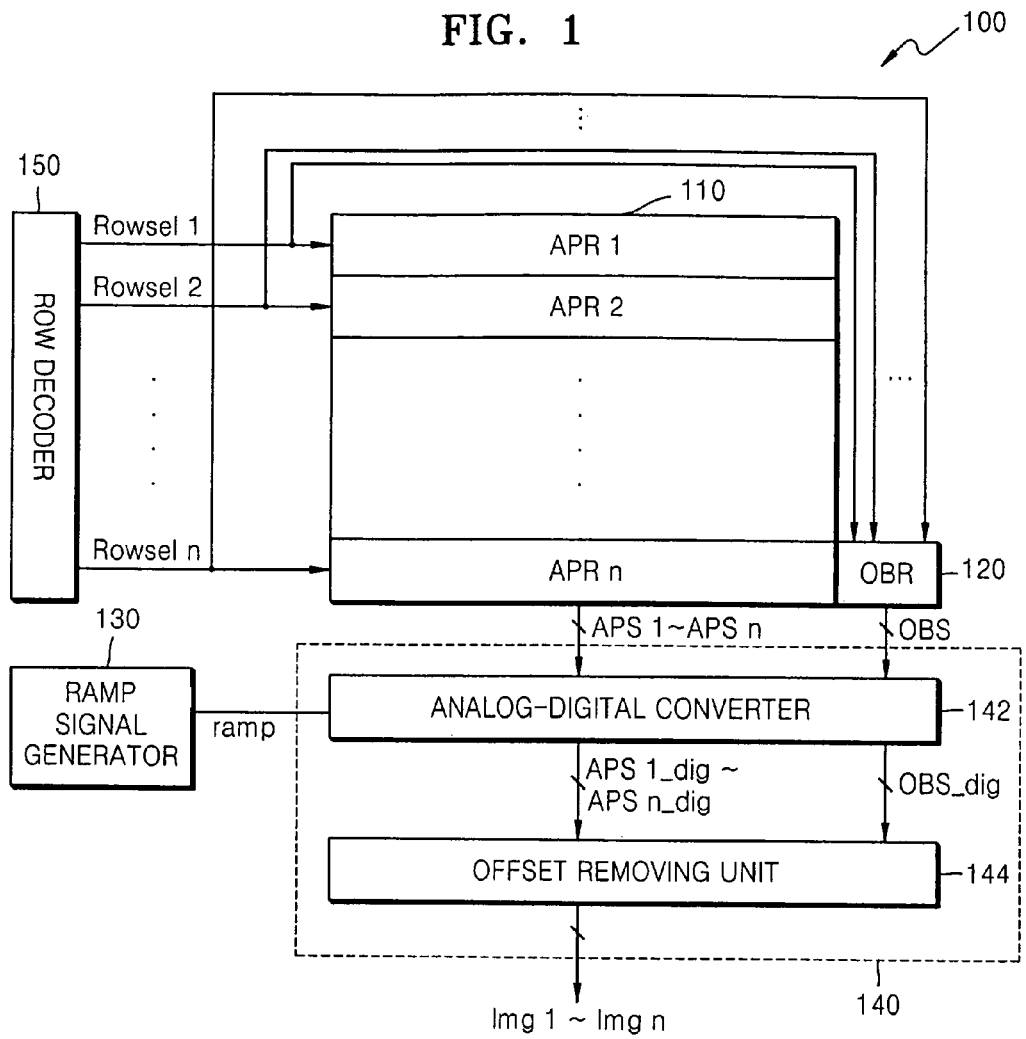
FIG. 1 is a block diagram of a CMOS image sensor having a small size optical black area according to a first embodiment of the present invention.

FIG. 1 is a block diagram of a CMOS image sensor 100 having a small size optical black area according to a first embodiment of the present invention. Referring to FIG. 1, the CMOS image sensor 100 includes a row decoder 150, an active pixel array 110, an optical black area 120, a ramp signal generator 130, and an image signal processor 140.

The row decoder 150 generates row select signals Rowsel1, Rowsel2, . . . , and Rowseln that are sequentially activated. The active pixel array 110 includes a plurality of active pixel rows APR1, APR2, . . . , and APRn, each have a plurality of active pixels. The active pixel rows APR1, APR2, . . . , and APRn sequentially output image signals APS1, APS2, . . . , and APSn, respectively, during activation of the row select signals Rowsel1, Rowsel2, . . . , and Rowseln, respectively.

The optical black area 120 has a single optical black pixel row OBR including one or more optical black pixels, in a first embodiment of the present invention. A metal layer is formed on the optical black pixels of the optical black area 120 to block out light, in one embodiment of the present invention. The optical black pixel row OBR outputs a respective optical black signal OBS from an optical black pixel upon activation of each of the row select signals Rowsel1, Rowsel2, . . . , and Rowseln.

The image signal processor 140 generates corrected image signals Img1, Img2, . . . , and Imgn by subtracting the respective optical black signal OBS from each of the image signals APS1, APS2, . . . , and APSn, respectively. The image signal processor 140 includes an analog-to-digital converter 142 and an offset removing unit 144.

The analog-to-digital converter 142 converts the image signals APS1, APS2, . . . , and APSn into digital image signals APS1_dig, APS2_dig, . . . , and APSn_dig; respectively, using a ramp signal from the ramp signal generator 130 in a correlated double sampling method. A correlated double sampling method using a ramp voltage in an analog-to-digital converter within a CMOS image sensor is individually and generally known to one of ordinary skill in the art of image sensors.

Additionally, the analog-to-digital converter 142 converts the respective optical black signal OBS into a respective digital optical black signal OBS_dig using the ramp signal, for each of the image signals APS1, APS2, . . . , and APSn. The offset removing unit 144 subtracts the respective digital optical black signal OBS_dig from each of the digital image signals APS1_dig, APS2_dig, . . . , and APSn_dig to generate the corrected image signals Img1, Img2, . . . , and Imgn, respectively.

Such corrected image signals Img1, Img2, . . . , and Imgn represent an image at the active pixel array 110 without the thermally generated charge carrier component and without the noise component of the ramp signal.

Figure 2:
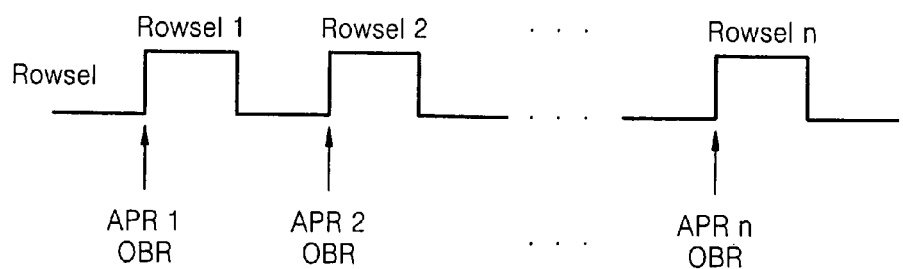
FIG. 2 is a timing diagram illustrating generation of signals from an active pixel array and an optical black area in FIG. 1 in response to row select signals, according to an embodiment of the present invention.

FIG. 2 is a timing diagram illustrating generation of signals from the active pixel rows APR1, APR2, . . . , and APRn and the optical black row OBR with sequential activation of the row select signals Rowsel1, Rowsel2, . . . , and Rowseln in the CMOS image sensor 100 of FIG. 1. In FIG. 2, each pulse represents activation of a respective one of the row select signals Rowsel1, Rowsel2, . . . , and Rowseln as labeled above each pulse.

Upon activation of one of the row select signals Rowsel1, Rowsel2, . . . , and Rowseln, a corresponding active pixel row is selected to output a corresponding image signal. In addition, the optical black pixel row OBR is also activated at each activation of the row select signals Rowsel1, Rowsel2, . . . , and Rowseln. Thus, the optical black pixel row OBR generates a respective optical black signal OBS for each of the image signals APS1, APS2, . . . , and APSn sequentially generated from the active pixel rows APR1, APR2, . . . , and APRn. In one embodiment of the present invention, the respective optical black signal OBS is simultaneously generated from the optical black pixel row OBR during generation of each of the image signals APS1, APS2, . . . , and APSn with each activation of the row select signals Rowsel1, Rowsel2, . . . , and Rowseln.

Figure 3:
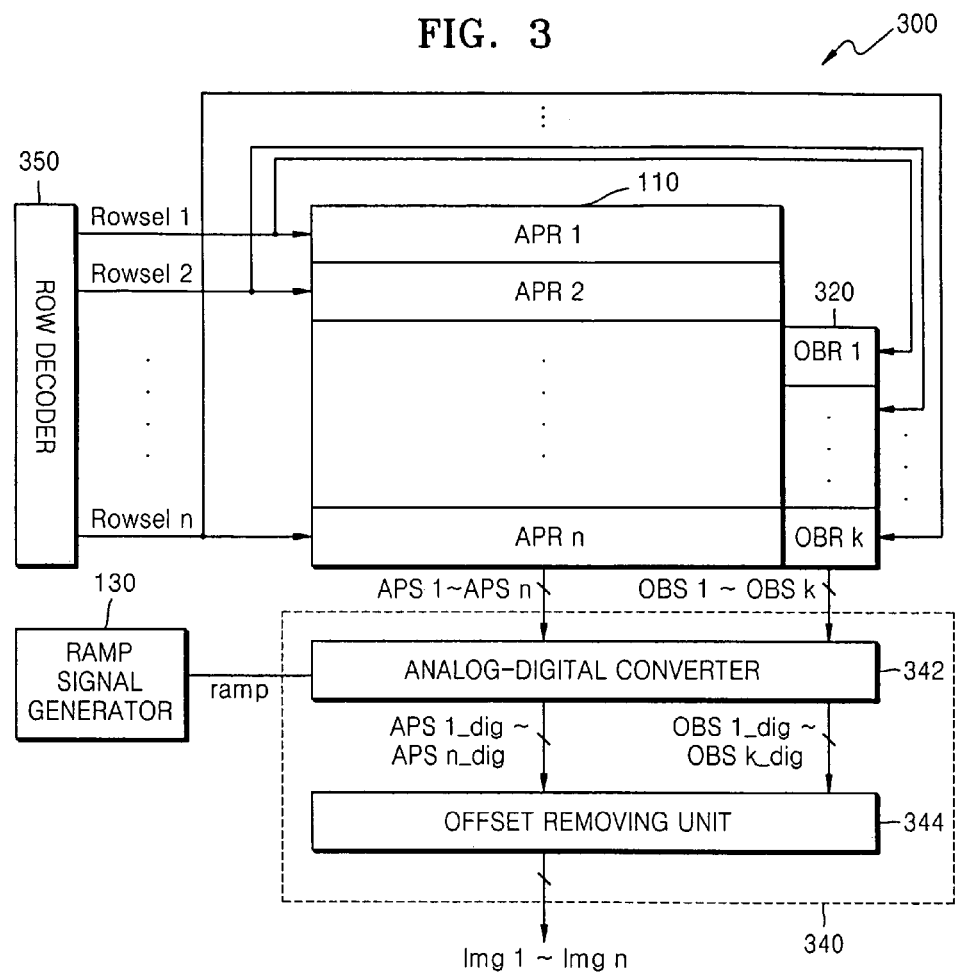
FIG. 3 is a block diagram of a CMOS image sensor having a small size optical black area according to a second embodiment of the present invention.

FIG. 3 is a block diagram of a CMOS image sensor 300 having a small size optical black area according to a second embodiment of the present invention. Referring to FIG. 3, the CMOS image sensor 300 includes a row decoder 350, an active pixel array 110, an optical black area 320, a ramp signal generator 130, and an image signal processor 340. Elements having the same reference number in FIGS. 1 and 3 refer to elements having similar structure and/or function.

The CMOS image sensor 300 of FIG. 3 is a more generalized embodiment from the CMOS image sensor 100 of FIG. 1. Thus, the optical black area 320 in FIG. 3 has one or more optical black pixel rows OBR1, OBR2, . . . , and OBRk, each having one or more optical black pixels. Generally, the number k of the optical black pixel rows OBR1, OBR2, . . . , and OBRk is smaller than the number n of the active pixel rows APR1, APR2, . . . , and APRn in FIG. 3.

In an aspect of the present invention, at least one of the optical black pixel rows OBR1, OBR2, . . . , and OBRk is shared for generating a respective optical black signal OBS by at least two of the active pixel rows APR1, APR2, . . . , and APRn. The row decoder 350 outputs the row select signals Rowsel1, Rowsel2, . . . , and Rowseln that are sequentially activated to the active pixel array 110 and the optical black area 320.

Generally, each of the optical black pixel rows OBR1, OBR2, . . . , and OBRk is activated to generate an optical black signal OBS by a respective logical combination of any subset of the row select signals Rowsel1, Rowsel2, . . . , and Rowseln. An optical black pixel row OBR1, OBR2, . . . , or OBRk generates a respective optical black signal OBS1, OBS2, . . . , or OBSk, respectively, when activated by such a respective logical combination of the subset of the row select signals Rowsel1, Rowsel2, . . . , and Rowseln. Thus, a respective optical black signal OBS1, OBS2, . . . , or OBSk is generated for each of the image signals APS1, APS2, . . . , and APSn from the active pixel rows.

The image signal processor 340 includes an analog-to-digital converter 342 and an offset removing unit 344. The analog-to-digital converter 342 converts the image signals APS1, APS2, . . . , and APSn into digital image signals APS1_dig, APS2_dig, . . . , and APSn_dig, respectively, in response to the ramp signal from the ramp signal generator 130. In addition, the analog-to-digital converter 342 converts the respective optical black signal OBS1, OBS2, . . . , or OBSk into a respective digital optical black signal OBS1_dig, OBS2_dig, . . . , or OBSk_dig, in response to the ramp signal.

The offset removing unit 344 subtracts the respective digital optical black signal OBS1_dig, OBS2_dig, . . . , or OBSk_dig from each of the digital image signals APS1_dig, APS2_dig, . . . , and APSn_dig to generate corrected image signals Img1, Img2, . . . , and Imgn, respectively. Such corrected image signals Img1, Img2, . . . , and Imgn represent an image at the active pixel array 110 in FIG. 3 without the thermally generated charge carrier component and without the noise component of the ramp signal.

Figure 4:
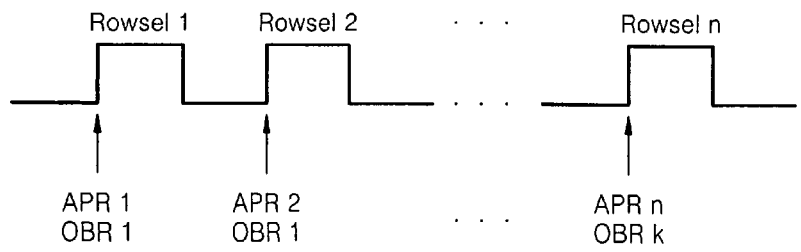
FIG. 4 is a timing diagram illustrating generation of signals from an active pixel array and an optical black area in FIG. 3 in response to row select signals, according to another embodiment of the present invention.

FIG. 4 is a timing diagram illustrating generation of signals from the active pixel rows APR1, APR2, . . . , and APRn and the optical black pixel rows OBR1, OBR2, . . . , and OBRk with sequential activation of the row select signals Rowsel1, Rowsel2, . . . , and Rowseln in the CMOS image sensor 300 of FIG. 3. In FIG. 4, each pulse represents activation of a respective one of the row select signals Rowsel1, Rowsel2, . . . , and Rowseln as labeled above each pulse.

Upon activation of one of the row select signals Rowsel1, Rowsel2, . . . , and Rowseln, a corresponding active pixel row is selected to output a corresponding image signal. In addition, one of the optical black pixel rows OBR1, OBR2, . . . , and OBRk is also activated to generate a respective optical black signal OBS1, OBS2, . . . , or OBSk at each activation of the row select signals Rowsel1, Rowsel2, . . . , and Rowseln.

FIG. 4 illustrates the example of the first and second active pixel rows APR1 and APR2 sharing the first optical black pixel row OBR1. Thus, when the Rowsel1 signal is activated, the first active pixel row APR1 generates a first image signal APS1. In addition, the first optical black pixel row OBS1 is activated to generate a respective optical black signal OBR1 corresponding to the first image signal APS1 during activation of the Rowsel 1 signal.

Subsequently, when the Rowsel 2 signal is activated, the second active pixel row APR2 generates a second image signal APS2. Furthermore, the first optical black pixel row OBR1 is again activated to generate a respective optical black signal OBS1 corresponding to the second image signal APS2 during the subsequent activation of the Rowsel 2 signal. FIG. 4 also illustrates the k-th optical black pixel row OBRk being activated to generate a respective optical black signal OBSk corresponding to the n-th image signal APSn during activation of the Rowseln signal.

A respective optical black signal OBS1, OBS2, . . . , or OBSk is generated from one of the optical black pixel rows OBR1, OBR2, . . . , and OBRk simultaneously as each of the image signals APS1, APS2, . . . , and APSn is generated during each activation of the row select signals Rowsel1, Rowsel2, . . . , and Rowseln.

In this manner, an optical black pixel row is shared by at least two active pixel rows for generating electrical signals corresponding to an image. Thus, the CMOS image sensor may have a smaller optical black area from the reduced number of optical black pixel rows.

The foregoing is by way of example only and is not intended to be limiting. For example, any numbers or number of elements described and illustrated herein is by way of example only. In addition, any type of device or any type of material as described or illustrated herein is by way of example only.

The present invention is limited only as defined in the following claims and equivalents thereof.

What is claimed is:

1. A CMOS image sensor comprising:
   a plurality of active pixel rows; and
   an optical black pixel row that is activated to generate a respective optical black signal upon simultaneous activation of each of at least two of the active pixel rows to generate a respective image signal,
   wherein a first row select pulse applied to said optical black pixel row and a first one of said active pixel rows is activated for simultaneous generation of said respective optical black signal from said optical black pixel row and said respective image signal from said first one of said active pixel rows during a first time period;
   and wherein a second row select pulse applied to same said optical black pixel row and a second one of said active pixel rows is activated for simultaneous generation of said respective optical black signal from same said optical black pixel row and said respective image signal from said second one of said active pixel rows during a second time period after said first time period,
   and wherein said optical black pixel row and said first and second active pixel rows are different rows of pixels.

2. The CMOS image sensor of claim 1, further comprising:
   an image signal processor that subtracts the respective optical black signal from the respective image signal to generate a respective corrected signal for each of the at least two active pixel rows.

3. The CMOS image sensor of claim 2, wherein the image signal processor includes:
   an analog-to-digital converter that generates a respective digital image signal from a ramp signal and the respective image signal, and that generates a respective digital optical black signal from the ramp signal and the respective optical black signal; and
   an offset removing unit for generating a respective digital corrected signal by subtracting the respective digital optical black signal from the respective digital image signal for each of the at least two active pixel rows.

4. The CMOS image sensor of claim 3, further comprising:
   a ramp signal generator that generates the ramp signal.

5. The CMOS image sensor of claim 1, wherein the optical black pixel row is the only one activated to generate a respective optical black signal for each of all of the active pixel rows.

6. The CMOS image sensor of claim 1, further comprising:
   a row decoder for generating row select control signals for sequentially activating each of the at least two active pixel rows,
   wherein the row select control signals activate the optical black pixel row when any of the at least two active pixel rows are activated.

7. The CMOS image sensor of claim 6, wherein the optical black pixel row outputs the respective optical black signal simultaneously with any of the at least two active pixel rows outputting the respective image signal.

8. The CMOS image sensor of claim 1, wherein the optical black pixel row includes at least one optical black pixel formed in an optical black area having a metal layer formed thereon.

9. A CMOS image sensor comprising:
a plurality of active pixel rows; and
a plurality of optical black pixel rows, at least one of the optical black pixel rows being activated to generate a respective optical black signal upon simultaneous activation of each of at least two of the active pixel rows to generate a respective image signal,
wherein a number of the active pixel rows in the CMOS image sensor is greater than a number of the optical black pixel rows in the CMOS image sensor,
wherein a first row select pulse applied to said optical black pixel row and a first one of said active pixel rows is activated for simultaneous generation of said respective optical black signal from said optical black pixel row and said respective image signal from said first one of said active pixel rows during a first time period;
and wherein a second row select pulse applied to same said optical black pixel row and a second one of said active pixel rows is activated for simultaneous generation of said respective optical black signal from same said optical black pixel row and said respective image signal from said second one of said active pixel rows during a second time period after said first time period,
and wherein said optical black pixel row and said first and second active pixel rows are different rows of pixels.

10. The CMOS image sensor of claim 9, further comprising:
an image signal processor that subtracts the respective optical black signal from the respective image signal to generate a respective corrected signal for each of the at least two active pixel rows.

11. The CMOS image sensor of claim 10, wherein the image signal processor includes:
an analog-to-digital converter that generates a respective digital image signal from a ramp signal and the respective image signal, and that generates a respective digital optical black signal from the ramp signal and the respective optical black signal; and
an offset removing unit for generating a respective digital corrected signal by subtracting the respective digital optical black signal from the respective digital image signal for each of the at least two active pixel rows.

12. The CMOS image sensor of claim 11, further comprising:
a ramp signal generator that generates the ramp signal.

13. The CMOS image sensor of claim 9, further comprising:
a row decoder for generating row select control signals for sequentially activating each of the at least two active pixel rows,
wherein the row select control signals activate the optical black pixel row when any of the at least two active pixel rows are activated.

14. The CMOS image sensor of claim 13, wherein the optical black pixel row outputs the respective optical black signal simultaneously with any of the at least two active pixel rows outputting the respective image signal.

15. The CMOS image sensor of claim 9, wherein each of the optical black pixel rows includes at least one optical black pixel formed in an optical black area having a metal layer formed thereon.

16. A method of sensing an image in a CMOS image sensor comprising:
activating sequentially a plurality of active pixel rows; and
activating an optical black pixel row to generate a respective optical black signal upon simultaneous activation of each of at least two of the active pixel rows to generate a respective image signal,
wherein a first row select pulse applied to said optical black pixel row and a first one of said active pixel rows is activated for simultaneous generation of said respective optical black signal from said optical black pixel row and said respective image signal from said first one of said active pixel rows during a first time period;
and wherein a second row select pulse applied to same said optical black pixel row and a second one of said active pixel rows is activated for simultaneous generation of said respective optical black signal from same said optical black pixel row and said respective image signal from said second one of said active pixel rows during a second time period after said first time period,
and wherein said optical black pixel row and said first and second active pixel rows are different rows of pixels.

17. The method of claim 16, further comprising:
subtracting the respective optical black signal from the respective image signal to generate a respective corrected signal for each of the at least two active pixel rows.

18. The method of claim 16, further comprising:
generating a respective digital image signal from a ramp signal and the respective image signal;
generating a respective digital optical black signal from the ramp signal and the respective optical black signal; and
generating a respective digital corrected signal by subtracting the respective digital optical black signal from the respective digital image signal for each of the at least two active pixel rows.

19. The method of claim 16, wherein the optical black pixel row is the only one activated to generate a respective optical black signal for each of all of the active pixel rows.

20. The method of claim 16, wherein the optical black pixel row outputs the respective optical black signal simultaneously with any of the at least two active pixel rows outputting the respective image signal.

* * * * *